(12) United States Patent
Wei et al.

(10) Patent No.: US 12,262,398 B2
(45) Date of Patent: Mar. 25, 2025

(54) TIME DIVISION MULTIPLEXING PATTERN FOR ANTENNA CONFIGURATIONS

(71) Applicant: ZTE CORPORATION, Guangdong (CN)

(72) Inventors: Xingguang Wei, Shenzhen (CN); Peng Hao, Shenzhen (CN); Jian Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 306 days.

(21) Appl. No.: 17/711,690

(22) Filed: Apr. 1, 2022

(65) Prior Publication Data

US 2022/0304009 A1 Sep. 22, 2022

Related U.S. Application Data

(63) Continuation of application No. PCT/CN2019/109805, filed on Oct. 2, 2019.

(51) Int. Cl.
*H04W 72/11* (2023.01)
*H04L 5/14* (2006.01)
*H04W 72/50* (2023.01)

(52) U.S. Cl.
CPC ......... *H04W 72/535* (2023.01); *H04L 5/1469* (2013.01)

(58) Field of Classification Search
CPC .... H04B 1/005; H04B 7/0404; H04B 7/0686; H04L 5/1469; H04W 72/535; H04W 88/06
See application file for complete search history.

(56) References Cited

U.S. PATENT DOCUMENTS

| 6,175,747 B1 * | 1/2001 | Tanishima ......... H04Q 11/0442 455/562.1 |
| 2006/0030265 A1 | 2/2006 | Desai et al. |
| 2016/0301456 A1 | 10/2016 | Clevorn et al. |

(Continued)

FOREIGN PATENT DOCUMENTS

| CN | 101635984 A | 1/2010 |
| CN | 105471558 A | 4/2016 |

(Continued)

OTHER PUBLICATIONS

Ericsson, "Enhancements to single-tx operation for EN-DC", 3GPP TSG-RAN WG1 Ad-Hoc Meeting 1901, R1-1901176, Jan. 25, 2019, Taipei, Taiwan (4 pages).

(Continued)

*Primary Examiner* — Mansour Oveissi
(74) *Attorney, Agent, or Firm* — Foley & Lardner LLP (57) ABSTRACT

A wireless communication method for use in a wireless terminal connected to a master wireless network node and a secondary wireless network node. The wireless communication method comprises configuring a first antenna to a first wireless network node in a first period of a time pattern, and configuring the first antenna and a second antenna to a second wireless network node in a second period of the time pattern, wherein the first wireless network node is one of the master wireless network node and the secondary wireless network node and the second wireless network node is another one of the master wireless network node and the secondary wireless network node.

14 Claims, 3 Drawing Sheets

(56) References Cited

U.S. PATENT DOCUMENTS

2016/0337109 A1\* 11/2016 Yasukawa ......... H04W 72/0446
2018/0152955 A1    5/2018 Park et al.
2020/0015097 A1\* 1/2020 Kazmi ................... H04W 4/70

FOREIGN PATENT DOCUMENTS

| CN | 107925963 A | 4/2018 |
|----|----|----|
| CN | 109495971 A | 3/2019 |
| CN | 110268789 A | 9/2019 |
| WO | WO-2015/105398 A1 | 7/2015 |
| WO | WO-2015/197142 A1 | 12/2015 |

OTHER PUBLICATIONS

Extended European Search Report for EP Appl. No. 19947646.6, dated May 16, 2023 (14 pages).
Huawei et al., "Remaining details of UL power control design", 3GPP TSG RAN WG1 Meeting #92, R1-1801462, Mar. 2, 2018, Athens, Greece (14 pages).
Huawei et al., "WID revision: RF requirements for NR frequency range 1 (FR1)", 3GPP TSG RAN Meeting #84, RP-192282, Sep. 20, 2019, Newport Beach, USA (5 pages).
International Search Report and Written Opinion for PCT Appl. No. PCT/CN2019/109805, dated Jun. 30, 2020.
First Office Action for CN Appl. No. 201980102598.6, dated Jul. 29, 2024 (with English translation, 11 pages).
Decision to Grant for CN Appl. No. 201980102598.6, dated Jan. 13, 2025 (with English translation, 12 pages).
Jingjing, W. et al., "On some physical layer technology in 5G wireless communication system", Journal of Terahertz Science and Electronic Information Technology, vol. 16, No. 6, Dec. 2018 (8 pages).

\* cited by examiner

| TDD configuration | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D: Downlink sub-frame
U: Uplink sub-frame
S: Special sub-frame

FIG. 4

| Subframe number | 0 | 1 | 2 | 3 | 4 | 5 | 6 | 7 | 8 | 9 |
|---|---|---|---|---|---|---|---|---|---|---|
| TDD configuration configuration 1 | D | S | U | U | D | D | S | U | U | D |

FIG. 5

TIME DIVISION MULTIPLEXING PATTERN FOR ANTENNA CONFIGURATIONS

CROSS-REFERENCE TO RELATED APPLICATION

This application claims the benefit of priority under 35 U.S.C. § 120 as a continuation of PCT Patent Application No. PCT/CN2019/109805, filed on Oct. 2, 2019, the disclosure of which is incorporated herein by reference in its entirety.

FIELD OF THE DISCLOSURE

This document is directed generally to wireless communications.

BACKGROUND

In a wireless network, a user equipment (UE) may operate in single connection or dual connectivity (DC), such as intra evolved universal terrestrial radio access (intra-E-UTRA) DC and multi-radio DC (MR-DC).

SUMMARY

When the UE operates in DC, the UE is configured to utilize resources provided by two different network nodes (e.g. a base station, evolved nodeB (eNB) and/or the next generation nodeB (gNB)), where one of the network nodes acts as a master node (MN) and another one of the network nodes acts as a secondary node (SN). In the MR-DC, the MN functions as the controlling entity and utilizes the SN for additional data capacity. The MR-DC configurations may include intra evolved-universal-terrestrial-radio-access (E-UTRA) DC (intra-E-UTRA DC), E-UTRA-new radio (NR) DC (EN-DC), NR-E-UTRA DC (NE-DC) and NR-NR DC. In an embodiment of the intra-E-UTRA DC, both the MN and the SN provide E-UTRA accesses. In an embodiment of the EN-DC or NE-DC, one of the MN and the SN provides an NR access and another one of the MN and the SN provides an E-UTRA access.

This document relates to methods, systems, and devices for configuring the antenna configuration of a wireless terminal, in particular, to methods, systems, and devices for configuring the antenna configuration of a wireless terminal operating in the EN-DC and/or the NE-DC.

The present disclosure relates to a wireless communication method for use in a wireless terminal connected to a master wireless network node and a secondary wireless network node. The wireless communication method comprises:

configuring a first antenna to a first wireless network node in a first period of a time pattern, and configuring the first antenna and a second antenna to a second wireless network node in a second period of the time pattern, wherein the first wireless network node is one of the master wireless network node and the secondary wireless network node and the second wireless network node is another one of the master wireless network node and the secondary wireless network node.

Various embodiments may preferably implement the following features:

Preferably, the first period does not overlap with the second period.

Preferably, the time pattern is a time division duplexing (TDD) configuration.

Preferably, one of the first period and the second period is configured within an uplink sub-frame.

Preferably, the wireless communication method further comprises receiving, from the first wireless network node, pattern information indicating the time pattern.

Preferably, the first wireless network node supports long-term evolution, LTE, and the second wireless network node supports new radio, NR.

Preferably, the wireless terminal does not support dynamic power sharing.

Preferably, the wireless communication method further comprises receiving, from the first wireless network node, first scheduling information for a first transmission to the first wireless network node, receiving, from the second wireless network node, second scheduling information for a second transmission to the second wireless network node, and performing at least one of the first transmission or the second transmission when determining the first transmission overlaps the second transmission.

Preferably, the wireless terminal performs at least one of the first transmission or the second transmission based on an overlapping period where the first transmission overlaps the second transmission.

Preferably, when the overlapping period is within an uplink sub-frame, the wireless terminal performs the first transmission.

Preferably, the wireless terminal drops the second transmission.

Preferably, the wireless terminal performs the second transmission when determining the second transmission requires one antenna.

Preferably, when the overlapping period is within one of a downlink sub-frame or a special sub-frame, the wireless terminal performs the second transmission.

Preferably, the wireless terminal does not support dynamic power sharing.

Preferably, the wireless terminal performs at least one of the first transmission or the second transmission based on scheduling information which indicates the maximum power for the first transmission and the second transmission when determining the first transmission overlaps the second transmission.

Preferably, when the scheduling information indicates that the maximum power for the first transmission is a first power and the maximum power for the second transmission is a second power, the wireless terminal drops the second transmission and performs the first transmission.

Preferably, when the scheduling information indicates that the maximum power for the first transmission is a first power and the maximum power for the second transmission is the first power, the wireless terminal performs the first transmission and the second transmission.

Preferably, the wireless terminal performs at least one of the first transmission or the second transmission based on scheduling information which indicates the number of ports configured to the second transmission when determining the first transmission overlaps the second transmission.

Preferably, when the scheduling information indicates that the number of ports configured to the second transmission is greater than one, the wireless terminal drops the second transmission and performs the first transmission.

Preferably, when the scheduling information indicates that the number of ports configured to the second transmission is one, the wireless terminal performs the first transmission and the second transmission.

Preferably, the wireless terminal performs at least one of the first transmission or the second transmission based on scheduling information which indicates the number of ports configured to a sound reference signal, SRS, resource of the second transmission when determining the first transmission overlaps the second transmission.

Preferably, when the scheduling information indicates that the number of ports configured to the SRS resource of the second transmission is greater than one, the wireless terminal drops the second transmission and performs the first transmission.

Preferably, when the scheduling information indicates that the number of ports configured to the SRS resource of the second transmission is one, the wireless terminal performs the first transmission and the second transmission.

Preferably, the period of the first transmission overlapping the second transmission is within an uplink sub-frame.

Preferably, when the scheduling information indicates that the maximum power for the first transmission is a first power and the maximum power for the second transmission is a second power, the wireless terminal drops the first transmission and performs the second transmission.

Preferably, when the scheduling information indicates that the number of ports configured to the second transmission is greater than one, the wireless terminal drops the first transmission and performs the second transmission.

Preferably, when the scheduling information indicates that the number of ports configured to the SRS resource of the second transmission is greater than one, the wireless terminal drops the first transmission and performs the second transmission.

Preferably, the wireless communication performs at least one of the first transmission or the second transmission based on the timings of receiving the first scheduling information and the second scheduling information.

Preferably, when the timing of receiving the first scheduling information is no later than the timing of receiving the second scheduling information, the wireless terminal performs the first transmission.

Preferably, the wireless terminal performs the second transmission when determining at least one of that the maximum power for the second transmission is a first power, that the number of ports configured to the second transmission is one or that the number of ports configured to a sound reference signal, SRS, of the second transmission resource is one.

Preferably, the wireless terminal drops the second transmission when determining at least one of that the maximum power for the second transmission is a second power, that the number of ports configured to the second transmission is greater than one or that the number of ports configured to a sound reference signal, SRS, resource of the second transmission is greater than one.

Preferably, when the timing of receiving the first scheduling information is after the timing of receiving the second scheduling information, the wireless terminal performs the second transmission.

Preferably, the wireless terminal performs the first transmission when determining at least one of that the maximum power for the second transmission is a first power, that the number of ports configured to the second transmission is one or that the number of ports configured to a sound reference signal, SRS, resource of the second transmission is one.

Preferably, the wireless terminal drops the first transmission when determining at least one of that the maximum power for the second transmission is a second power, that the number of ports configured to the second transmission is greater than one or that the number of ports configured to a sound reference signal, SRS, resource of the second transmission is greater than one.

Preferably, the period of the first transmission overlapping the second transmission is within one of a downlink sub-frame or a special sub-frame.

Preferably, the wireless terminal supports dynamic power sharing.

The present disclosure also relates to a wireless communication method for use in a first wireless network node. The wireless communication method comprises transmitting, to a wireless terminal connected to the first wireless network node and a second wireless network node, pattern information for indicating a time pattern of configuring a first antenna and a second antenna of the wireless terminal.

Various embodiments may preferably implement the following feature:

Preferably, the first wireless network node supports long-term evolution, LTE and the second wireless network node supports new radio, NR.

The present disclosure also relates to a wireless terminal comprising a processor and a storage unit, wherein the processor is configured to read a program code from the storage unit and implement a wireless communication method recited in any of foregoing described methods.

The present disclosure also relates to a wireless network node comprising a processor and a storage unit, wherein the processor is configured to read a program code from the storage unit and implement a wireless communication method recited in any of foregoing described methods.

The present disclosure also relates to a computer-readable program medium code stored thereupon is disclosed according to an embodiment of the present disclosure, and the code, when executed by a processor, causing the processor to implement a wireless communication method recited in any of foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

BRIEF DESCRIPTION OF THE DRAWING

The above and other aspects and their implementations are described in greater detail in the drawings, the descriptions, and the claims.

DETAILED DESCRIPTION

Figure 1:
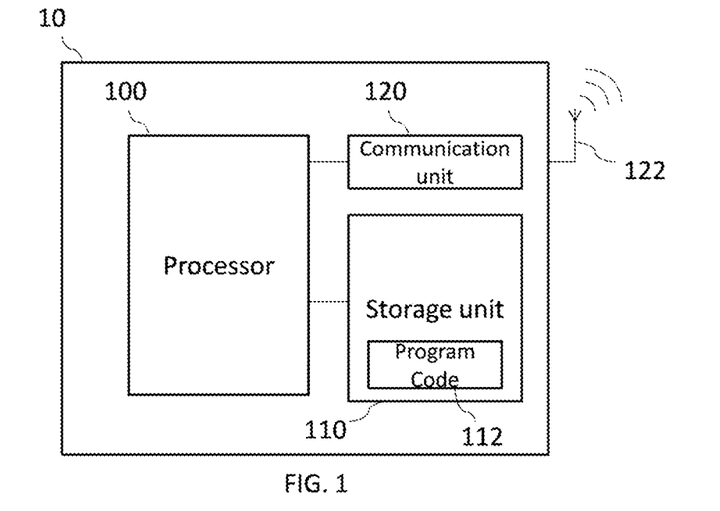
FIG. 1 shows a schematic diagram of a network device according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10.

The communication unit 120 may be a transceiver. The communication unit 120 may as an alternative or in addition be combining a transmitting unit and a receiving unit configured to transmit and to receive, respectively, signals to and from a wireless network node (e.g. a base station (BS)).

Figure 2:
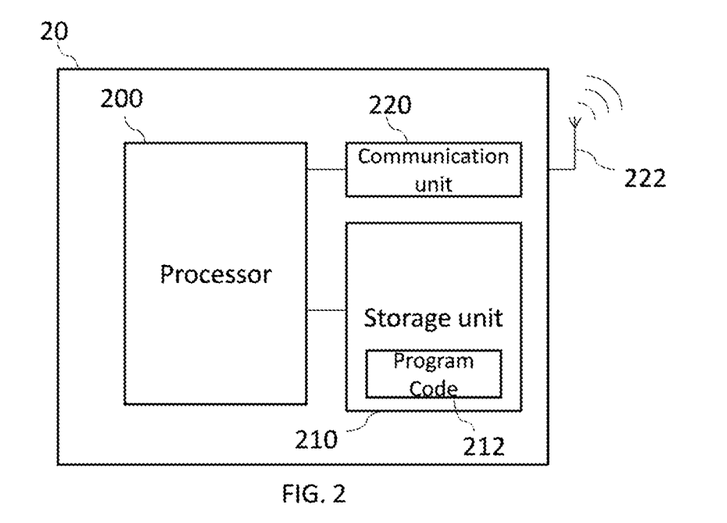
FIG. 2 shows of a schematic diagram of a wireless network node according to an embodiment of the present disclosure.

FIG. 2 relates to a schematic diagram of a wireless network node 20 according to an embodiment of the present disclosure. The wireless network node 20 may be a base station (BS), a network entity, a Mobility Management Entity (MME), Serving Gateway (S-GW), Packet Data Network (PDN) Gateway (P-GW), or Radio Network Controller (RNC), and is not limited herein. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment (UE)).

In an embodiment, a wireless terminal (e.g. a UE) is connected to a master node (MN) and a secondary node (SN) (i.e. operates in the MR-DC). In this embodiment, one of the MN and the SN supports long-term evolution (LTE) and another one of the MN and the SN supports new radio (NR). For example, one of the MN and the SN is an eNB and another one of the MN and the SN is a gNB. In other words, the wireless terminal operates in the EN-DC or the NE-DC.

Generally speaking, a carrier configured for the LTE is in a lower frequency band when comparing to a carrier configured for the NR. In an embodiment, one antenna is sufficient for transmitting the carrier configured for the LTE since the transmission loss in the lower frequency band is smaller than that in the higher frequency band. In comparison, the carrier configured for the NR may encounter worse over-the-air channel condition and higher transmission loss because operating in the higher frequency band. In order to improve communication quality, the wireless terminal may adopt multi-input multi-output (MIMO), i.e., increasing the number of antennas used for the transmission in the higher frequency band. For example, the wireless terminal may use two antennas for the carrier of the higher frequency band (e.g. the carrier configured for the NR). Since one antenna is used for the carrier in the lower frequency band (e.g. the carrier configured for the LTE) and two antennas are used for the carrier in the higher frequency band (e.g. the carrier configured for the NR), the wireless terminal may require three antennas in its communication unit (e.g. the wireless terminal 10 has three antennas 122) for performing two concurrent transmission when operating in the EN-DC or the NE-DC. However, three antennas will significantly increase power consumption of the wireless terminal. In addition, the wireless terminal may not able to bring three antennas into its structure design because of cost and appearance requirements. In order to reduce the cost and the power consumption of the wireless terminal, the carriers of the LTE and the NR may share one antenna in an embodiment of the present disclosure. That is, the wireless terminal of the present disclosure requires two, rather than three, antennas. As a result, not only the cost and the power consumption of the wireless terminal are decreased, but also the structure design of the wireless terminal is simplified.

In an embodiment, the wireless terminal has two antennas (e.g. transmission (TX) antennas) and their corresponding radio frequency (RF) components for supporting the EN-DC/NE-DC with two carriers (e.g. uplink (UL) carriers), wherein one of the two carriers is configured for the wireless network node supporting the LTE and another of the two carriers is configured for the wireless network node supporting the NR. Note that, each antenna and its RF components are reserved for the one carrier.

In an embodiment of the wireless terminal being equipped with two antennas ANT1 and ANT2, the wireless terminal may configure the antenna ANT1 to the carrier of the LTE or the NR based on a time pattern (e.g. a time division multiplexing (TDM) pattern) and may configure the antenna ANT2 constantly to the carrier of the NR when operating in the NE-DC or EN-DC. In other words, the wireless terminal configures the antenna ANT1 to the wireless network node supporting the LTE or the wireless network node supporting the NR based on the time pattern and constantly configures the antenna ANT 2 to the wireless network node supporting the NR, wherein the wireless network node supporting the LTE is one of the MN and the SN and the wireless terminal node supporting the NR is another one of the MN and the SN.

For example, the wireless terminal may configure the antennas ANT1 to the carrier of the LTE in a period P1 of the time pattern and configure the antennas ANT1 to the carrier of the NR in a period P2 of the time pattern. In an embodiment, the period P1 does not overlap with the period P2. In the period P1, the wireless terminal is able to transmit signals to the wireless network node supporting the LTE via the antenna ANT1. In the period P2, the wireless terminal may only transmit signals to the wireless network node supporting the NR because both the antennas ANT1 and ANT2 are configured to the carrier of the NR. In addition to reducing the cost and the power consumption of the wireless terminal, resource allocations of wireless communications can be balanced and the scheduling complexity of the wireless communications can be simplified.

Figure 3:
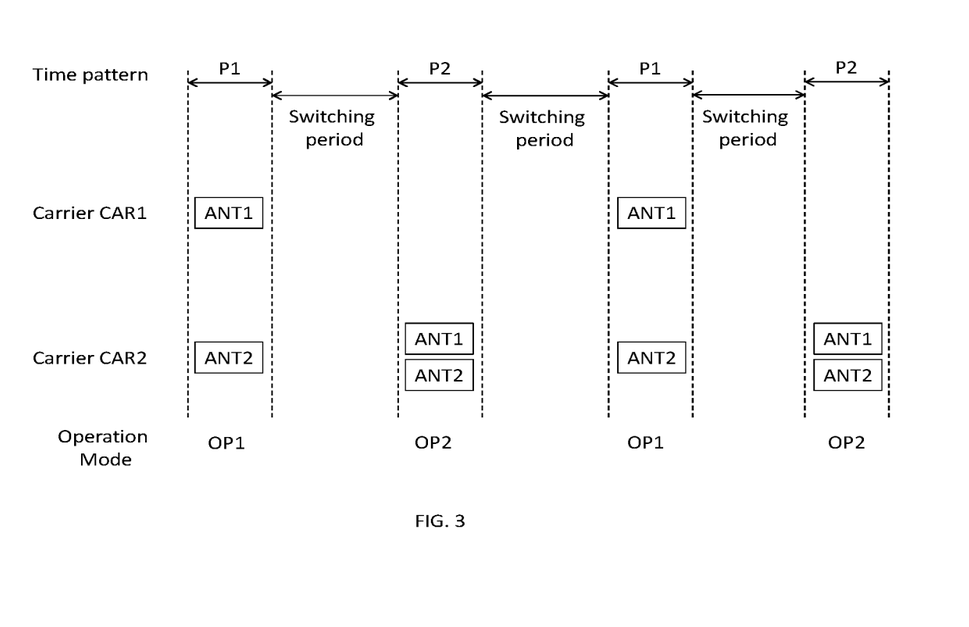
FIG. 3 shows a schematic diagram of a time pattern according to an embodiment of the present disclosure.

FIG. 3 shows a schematic diagram of a time pattern according to an embodiment of the present disclosure. In this embodiment, the wireless terminal comprises the antennas ANT1 and ANT2 and operates in an operation mode OP1 or another operation mode OP2 for communicating with a wireless network node N1 supporting LTE and a wireless network node N2 supporting the NR. The wireless terminal operates in the operation mode OP1 in the periods P1 and operates in the operation mode OP2 in the periods P2. When operating in the operation mode OP1, the wireless terminal reserves the antenna ANT1 for a carrier CAR1 of the wireless network node N1 and reserves the antenna ANT2 for a carrier CAR2 of the wireless network node N2. When operating in the operation mode OP2, the wireless terminal reserves both the antennas ANT1 and ANT2 for the carrier CAR2 of the wireless network node N2. As shown in FIG. 3, the wireless terminal switches between the operation modes OP1 and OP2 based on the time pattern. In the periods P1 of the time pattern, the wireless terminal operates in the operation mode OP1. In periods P2 of the time pattern, the wireless terminal operates in the operation mode OP2.

Note that, the time pattern shown in FIG. 3 is only for illustrations and the periods P1 and P2 are not required to be interleaved as show in FIG. 3.

In FIG. 3, there are switching periods between periods P1 and P2, allowing the wireless terminal completes switching between the operation mode OP1 and OP2.

Figure 4:
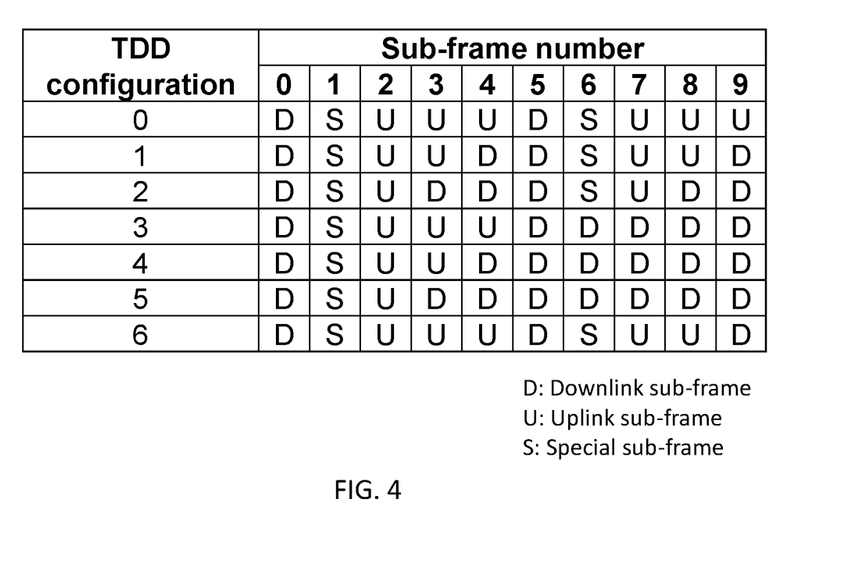
FIG. 4 shows an example of a table of time division duplexing (TDD) configurations according to an embodiment of the present disclosure.

In an embodiment, the time pattern of configuring the antennas of the wireless terminal may be a Time Division Duplexing (TDD) configuration. For example, the time pattern may be a reference TDD configuration with a radio resource control (RRC) configuration. In an embodiment, the TDD configuration may distribute time units to uplink (UL) sub-frames, downlink (DL) sub-frames and special sub-frames. In an embodiment, the period P1 is configured within the time units (e.g. the period) distributed to the UL sub-frames and the period P2 is configured within the time units distributed to the DL sub-frame and the special sub-frames (i.e. the sub-frame other than the UL sub-frames). In another embodiment, the period P1 is configured within the time units distributed to the sub-frames other than the UL sub-frames and the period P2 is configured within the time units distributed to the UL sub-frames. FIG. 4 shows a schematic diagram of a table of TDD configurations according to an embodiment of the present disclosure. In FIG. 4, seven TDD configurations 1 to 7 are exemplified, wherein "U" represents for time units configured to the UL sub-frames, "D" represents for time units configured to the DL sub-frames and "S" represent for time units configured to the special sub-frames. In addition, each TDD configuration comprises 10 sub-frames which are numbered from 0 to 9. Based on the TDD configurations shown in FIG. 4, the wireless terminal is able to determine timings of switching between the operation modes OP1 and OP2 (i.e. changing the antenna configurations).

Figure 5:
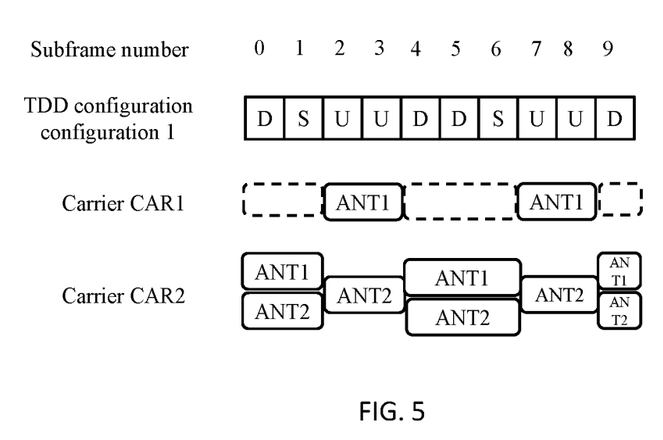
FIG. 5 shows a schematic diagram of a time pattern according to an embodiment of the present disclosure.

FIG. 5 shows an example of the time pattern being the TDD configuration according to an embodiment of the present disclosure. In this embodiment, the time pattern is the TDD configuration 1 shown in FIG. 4 and the wireless terminal operates in the operation mode OP1 within the UL sub-frames and operates in the operation mode OP2 within the sub-frames other than the UL sub-frames (i.e. the DL sub-frames and the special sub-frames). Thus, the wireless terminal configures the antenna ANT1 to the carrier CAR1 of the LTE and configures the antenna ANT2 to the carrier CAR2 of the NR within the sub-frames whose number is 2, 3, 4, 7 and 8 and configures the antennas ANT1 and ANT2 to the carrier CAR2 of the NR within the sub-frames whose number is 0, 1, 5, 6 and 9. Under such a condition, the wireless terminal is able to share the antenna ANT1, so as to decrease the cost and the power consumptions. Moreover, the resource allocations of the wireless communications are balanced and the scheduling complexity of the wireless communications is simplified.

In an embodiment, the time pattern is configured from the wireless network node supporting the LTE, e.g., via a RRC signaling to the wireless terminal. For example, the wireless network node supporting the LTE may indicate the time pattern via transmitting pattern information to the wireless terminal.

In an embodiment, the time pattern is configured (e.g. indicated) to the wireless terminal after the wireless terminal indicates the wireless network of the wireless terminal (e.g. the wireless network node supporting the LTE) that the wireless terminal is able to switch between the operation modes OP1 and OP2. In other words, the wireless terminal may indicate the wireless network that the UE is capable of sharing the antenna and accordingly being indicated the time pattern of configuring the antennas.

In an embodiment, the wireless terminal operating in the NE-DC or the EN-DC receives a scheduling information SI_LTE (e.g. a UL signaling) of configuring a (UL) transmission to the wireless network node supporting the LTE (i.e. LTE transmission) and receives a scheduling information SL NR (e.g. a UL signaling) of configuring a (UL) transmission to the wireless network node supporting the NR (i.e. NR transmission). When adopting the time pattern of configuring the antennas of the wireless terminal, the wireless network of the wireless terminal is able to guarantee that the LTE transmission does not overlap the NR transmission if the wireless network nodes supporting the LTE and the NR have tight coordination. However, in practical network deployment, the tight coordination between the wireless network nodes supporting the LTE and the NR in the EN-DC and/or the NR-DC is not always guaranteed because the wireless network nodes supporting the LTE and the NR have separate schedulers. Without such tight coordination between the wireless network nodes supporting the LTE and the NR, the LTE transmission may overlap with the NR transmission. When determining that the LTE transmission overlaps the NR transmission, the wireless terminal may perform at least one of the LTE transmission or the NR transmission under different scenarios. In the following, various embodiments of how the wireless terminal determines performing at least one of the LTE transmission or the NR transmission are illustrated.

In an embodiment, the behaviors of the wireless terminal determining performing at least one of the LTE transmission or the NR transmission when determining that the LTE transmission overlaps the NR transmission may change according to whether the wireless terminal support dynamic power sharing. Note that, the wireless terminal supporting the dynamic power sharing is able to dynamically share transmission power between the LTE transmission and the NR transmission according to the scheduling information SI_LTE and SI_NR. In addition, the wireless terminal, which does not support the dynamic power sharing, can only separate the UL transmission power semi-statically.

In order to simplifying illustrations, the wireless terminal in the following embodiments operates in the operational mode OP1 (i.e. one antenna is configured to the LTE and another antenna is configured to the NR) within the UL sub-frames designated by the adopted TDD configuration and operates in the operational mode OP2 (i.e. both two antennas are configured to the NR) within the DL sub-frames and the special sub-frames designated by the adopted TDD configuration. Skilled person should be able to apply necessary changes if the wireless terminal changes to operate in the operational mode OP2 within the UL sub-frames designated by the adopted TDD configuration and operates in the operational mode OP1 within the DL sub-frames and the special sub-frames designated by the adopted TDD configuration.

In an embodiment of the wireless terminal does not support the dynamic power sharing, the wireless terminal supports the time pattern. In other words, the wireless terminal which does not support the dynamic power sharing configures its antennas and/or switches between the operation modes OP1 and OP2 based on the time pattern (e.g. a TDD configuration).

In an embodiment of the wireless terminal does not support the dynamic power sharing and determines that LTE transmission overlaps the NR transmission, the wireless terminal determines performing the LTE transmission and/or the NR transmission based on an overlapping period of the LTE transmission overlapping the NR transmission. For example, when the wireless terminal supports the TDD configuration, the wireless terminal may determining performing the LTE transmission and/or the NR transmission based on determining the overlapping period is within the UL sub-frames or the sub-frames other than the UL sub-frames in the adopted TDD configuration. When the overlapping period is within the UL sub-frame, the wireless terminal may perform the LTE transmission. In an example, the wireless terminal may drop the NR transmission if determining the NR transmission requires two antennas. In this example, the wireless terminal may perform both the LTE transmission and the NR transmission when determining the NR transmission does not require two antennas.

In an embodiment, the wireless terminal determines the number of antennas required nu the NR transmission based on the scheduling information SI_NR.

In an embodiment of the wireless terminal does not support the dynamic power sharing and determines the overlapping period between the LTE transmission and the NR transmission is within a sub-frame other than the UL sub-frames in the adopted TDD configuration, the wireless terminal performs the NR transmission and drops the LTE transmission.

In an embodiment, the wireless terminal does not support the dynamic power sharing and determines that the overlapping period between the LTE transmission and the NR transmission is not within the UL sub-frames and is within the period of the operation mode OP1 (i.e. one antenna is configured to the LTE and another antenna is configured to the NR). Under such a condition, the wireless terminal extends the period of operating in the operation mode OP2 for performs the NR transmission.

In an embodiment, the wireless terminal supports the dynamic power sharing and operates in the EN-DC or the NE-DC. The wireless terminal is able to adjust the UL transmission power for the NR transmission based on the scheduling information SI_LTE of the LTE transmission. But, the wireless terminal cannot adjust the UL transmission power for the LTE transmission based on the scheduling information SI_NR of the NR transmission.

In an embodiment of the wireless terminal supports the dynamic power sharing, operates in the EN-DC or the NE-DC and determines the LTE transmission overlaps the NR transmission within the UL sub-frames of the adopted TDD configuration, the wireless terminal determines performing the LTE transmission and/or the NR transmission based on the maximum power for the LTE transmission and the NR transmission. In an example, the wireless terminal determines the maximum power for the LTE transmission and the NR transmission based on scheduling information (e.g. the scheduling information SI_LTE of the LTE transmission and the scheduling information SI_NR of the NR transmission). In an example, the wireless terminal determines the maximum power for the LTE transmission is a power PT1 (e.g. 23 dBM) and the maximum power for the NR transmission is a power PT2 (e.g. 26 dBM). During the UL sub-frame designated by the adopted TDD configuration, one antenna is reserved for the LTE and another antenna is reserved for the NR. Further, the NR transmission require two antennas when the maximum power for the NR transmission is the power PT2. Thus, the wireless terminal drops the NR transmission and performs the LTE transmission since only one antenna is available for the NR transmission. In an example, the wireless terminal determines the maximum power for the LTE transmission is the power and the maximum power for the NR transmission is also the power PT1. The wireless terminal transmits both the LTE transmission and the NR uplink transmission because the total power of transmitting both the LTE transmission and the NR uplink transmission may still supported by the wireless terminal.

In an embodiment of the wireless terminal supports the dynamic power sharing, operates in the EN-DC or the NE-DC and determines the LTE transmission overlaps the NR transmission within the UL sub-frames of the adopted TDD configuration, the wireless terminal determines performing the LTE transmission and/or the NR transmission based on the number of antenna ports configured to the NR transmission. When the number of antenna ports configured to the NR transmission is greater than one (e.g. two), the maximum power for the NR transmission may be the power PT2 and the NR transmission may require two antennas. Thus, when the number of antenna ports configured to the NR transmission is greater than one, the wireless terminal drops the NR transmission and performs the LTE transmission since only one antenna is available for the NR transmission. When the number of antenna ports configured to the NR transmission is one, the wireless terminal transmits both the LTE transmission and the NR uplink transmission.

In an embodiment of the wireless terminal supports the dynamic power sharing, operates in the EN-DC or the NE-DC and determines the LTE transmission overlaps the NR transmission within the UL sub-frames of the adopted TDD configuration, the wireless terminal determines performing the LTE transmission and/or the NR transmission based on the number of ports configured to a sound reference signal (SRS) resource for the NR transmission. In an embodiment, the number of ports configured to the SRS resource is indicated by a SRS resource indicator in downlink control information (DCI), e.g., configured by the wireless node supporting the LTE. When the number of ports configured to the SRS resource for the NR transmission is greater than one (e.g. two), the maximum power for the NR transmission may be the power PT2 and the NR transmission may require two antennas. Thus, when the number of antenna ports configured to the NR transmission is greater than one, the wireless terminal drops the NR transmission and performs the LTE transmission since only one antenna is available for the NR transmission. When the number of antenna ports configured to the NR transmission is one, the wireless terminal transmits both the LTE transmission and the NR transmission.

In an embodiment of the wireless terminal supports the dynamic power sharing, operates in the EN-DC or the NE-DC and determines the LTE transmission overlaps the NR transmission within a sub-frame other than the UL sub-frames of the adopted TDD configuration, the wireless terminal determines performing the LTE transmission and/or the NR transmission based on the maximum power for the LTE transmission and the NR transmission. When the wireless terminal determines the maximum power for the LTE transmission is the power PT1 (e.g. 23 dBM) and the maximum power for the NR transmission is the power PT2 (e.g. 26 dBM), the wireless terminal drops the LTE transmission and perform the NR transmission because in the sub-frame other than the UL sub-frame two antennas are reserved for the NR. In this embodiment, when the wireless terminal determines the maximum power for the LTE transmission is the power PT1 (e.g. 23 dBM) and the maximum power for the NR transmission is also the power PT1, the wireless terminal switches back to the operation mode OP1 and transmits both the LTE transmission and the NR transmission since there may be sufficient transmission power for both the LTE transmission and NR transmission. However, since a scheduling delay of the LTE is larger than that of the NR, the wireless terminal may not have enough time to cancel the LTE transmission. In an embodiment, the scheduling delay for of a physical shared channel (PUSCH) of the LTE is 4 ms. That is, the wireless network node supporting the LTE indicates a UL grant to the UE 4 ms before the PUSCH transmission scheduled by the UL grant. On the other hand, the scheduling delay of the NR is smaller than 4 ms (e.g., 1 ms or 2 ms). After receiving the UL grant (i.e. the scheduling information SI_LTE), the wireless terminal starts preparing the LTE transmission. If the wireless terminal receives a NR UL grant (i.e. the scheduling information SI_NR) after the wireless terminal has started preparing the LTE transmission, the wireless terminal is not capable of canceling an ongoing progress. Under such a condition, the wireless terminal may transmit the LTE transmission and drop the NR transmission. In other words, in the embodiment of the wireless terminal supports the dynamic power sharing, operates in the EN-DC or the NE-DC and determines the LTE transmission overlaps the NR transmission within a sub-frame other than the UL sub-frames of the adopted TDD configuration, the wireless terminal may transmit the LTE transmission and drop the NR transmission if receiving the scheduling information SI_LTE before and/or no later than receiving the scheduling information SI_NR.

In an embodiment of the wireless terminal supports the dynamic power sharing, operates in the EN-DC or the NE-DC and determines the LTE transmission overlaps the NR transmission within a sub-frame other than the UL sub-frames of the adopted TDD configuration, the wireless terminal determines performing the LTE transmission and/or the NR transmission based on the number of antenna ports configured to the NR transmission. During the subframe other than the UL sub-frames designated by the reference TDD configuration, the wireless terminal operate in the operation mode OP2 (i.e. both the two antennas are reserved for the NR transmission). In order to reduce the switching impact, the wireless terminal transmits the NR transmission and drops the LTE transmission when determining the number of antenna ports configured to the NR transmission is greater than one (e.g. two). In addition, when determining the number of antenna ports configured to the NR transmission is one, the wireless terminal may switch back to the operation mode OP1 and perform both the LTE transmission and NR transmission since there may be enough transmission power for both the LTE transmission and NR transmission. However, since the scheduling delay of the LTE is larger than that of the NR, the wireless terminal may not have enough time to cancel the LTE transmission. Thus, the wireless terminal may transmit the LTE transmission and drop the NR transmission if receiving the scheduling information SI_LTE before and/or no later than receiving the scheduling information SI_NR.

In an embodiment of the wireless terminal supports the dynamic power sharing, operates in the EN-DC or the NE-DC and determines the LTE transmission overlaps the NR transmission within a sub-frame other than the UL sub-frames of the adopted TDD configuration, the wireless terminal determines performing the LTE transmission and/or the NR transmission based on the number of ports configured to a SRS resource for the NR transmission. In an embodiment, the number of ports configured to the SRS resource is indicated by a SRS resource indicator (SRI) in downlink control information (DCI). When the number of ports configured to the SRS resource for the NR transmission is greater than one (e.g. two), the maximum power for the NR transmission may be the power PT2 and the NR transmission may require two antennas. Thus, when the number of antenna ports configured to the NR transmission is greater than one, the wireless terminal drops the LTE transmission and performs the NR transmission. When the number of antenna ports configured to the NR transmission is one, the wireless terminal transmits both the LTE transmission and the NR transmission since the NR transmission may require only one antenna. The wireless terminal therefore can utilize the remaining antenna and transmission power for the LTE transmission and the LTE system performance is enhanced.

In an embodiment of the wireless terminal supports the dynamic power sharing, operates in the EN-DC or the NE-DC and determines the LTE transmission overlaps the NR transmission within a sub-frame other than the UL sub-frames of the adopted TDD configuration, the wireless terminal determines performing the LTE transmission and/or the NR transmission based on the timings of receiving the scheduling information SI_LTE and SI_NR. Once the UE receives an uplink grant, UE starts preparing the uplink transmission. Once the wireless terminal starts preparing the transmission, the wireless terminal may not be able to cancel the transmission under preparing. Thus, the wireless terminal may transmit the transmission whose scheduling information is received earlier. If receiving the scheduling information SI_NR of the NR uplink transmission earlier than receiving the scheduling information SI_LTE of the LTE uplink transmission, the wireless terminal transmits the NR transmission. Note that, when the scheduling information SI_NR is received earlier than the scheduling information SI_LTE is received, the wireless terminal may drop the LTE transmission based on at least one of the maximum power for the NR transmission, the number of antenna ports configured for the NR transmission or the number of ports configured for the SRS resource of the NR transmission. If the corresponding maximum power for the NR transmission is the power PT2 (e.g. 26 dBm), the wireless terminal drops the LTE uplink transmission since there is no uplink transmission power for the LTE transmission; otherwise, the wireless terminal may also transmit the LTE transmission. If the number of antenna ports configured for the NR transmission is greater than one, the wireless terminal drops the LTE uplink transmission since there may not be enough uplink transmission power for the LTE transmission; otherwise, the wireless terminal may also transmit the LTE transmission. If the number of antenna ports configured to the SRS resource of the NR transmission, the wireless terminal drops the LTE uplink transmission since there is no uplink transmission power for the LTE transmission; otherwise, the wireless terminal may also transmit the LTE transmission.

Various exemplary embodiments of the present disclosure are described below with reference to the accompanying figures to enable a skilled person to make and use the present disclosure. As would be apparent to those of ordinary skill in the art, after reading the present disclosure, various changes or modifications to the examples described herein can be made without departing from the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, signals, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or signals structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A wireless communication method for use in a wireless terminal connected to a master wireless network node and a secondary wireless network node, comprising:
    configuring a first antenna to a first wireless network node in a first period of a time pattern, and
    configuring the first antenna and a second antenna to a second wireless network node in a second period of the time pattern,
    wherein the first wireless network node is one of the master wireless network node and the secondary wireless network node and the second wireless network node is another one of the master wireless network node and the secondary wireless network node,
    wherein the time pattern is a time division duplexing (TDD) configuration,
    wherein one of the first period and the second period is configured within an uplink sub-frame,
    wherein, in response to the wireless terminal operating in a first mode in the first period of the TDD configuration, the first antenna is configured for the first wireless network node supporting long-term evolution (LTE) and the second antenna is not configured for the first wireless network node supporting LTE, and
    wherein, in response to the wireless terminal operating in a second mode in the second period of the TDD configuration, both the first antenna and the second antenna are configured for the second wireless network node supporting new radio (NR).

2. The wireless communication method of claim 1, wherein the first period does not overlap with the second period.

3. The wireless communication method of claim 1, further comprising:
    receiving, from the first wireless network node, first scheduling information for a first transmission to the first wireless network node,
    receiving, from the second wireless network node, second scheduling information for a second transmission to the second wireless network node, and
    performing at least one of the first transmission or the second transmission when determining the first transmission overlaps the second transmission.

4. The wireless communication method of claim 3,
    wherein when an overlapping period is within an uplink sub-frame, the wireless terminal performs the first transmission, and drops the second transmission, or performs the second transmission when determining the second transmission requires one antenna,
    wherein when the overlapping period is within one of a downlink sub-frame or a special sub-frame, the wireless terminal performs the second transmission,
    wherein when the first scheduling information and the second scheduling information indicate that a maximum power for the first transmission is a first power and the maximum power for the second transmission is a second power, the wireless terminal drops the second transmission and performs the first transmission,
    wherein when the first scheduling information and the second scheduling information indicate that the maximum power for the first transmission is a first power and the maximum power for the second transmission is the first power, the wireless terminal performs the first transmission and the second transmission,
    wherein when the second scheduling information indicates that a number of antenna ports configured to the second transmission is greater than one, the wireless terminal drops the second transmission and performs the first transmission,
    wherein when the second scheduling information indicates that the number of antenna ports configured to the second transmission is one, the wireless terminal performs the first transmission and the second transmission,
    wherein when the second scheduling information indicates that the number of antenna ports configured to the SRS resource of the second transmission is greater than one, the wireless terminal drops the second transmission and performs the first transmission, or
    wherein when the second scheduling information indicates that the number of antenna ports configured to the SRS resource of the second transmission is one, the wireless terminal performs the first transmission and the second transmission.

5. The wireless communication method of claim 4, wherein the period of the first transmission overlapping the second transmission is within an uplink sub-frame or within one of a downlink sub-frame or a special sub-frame.

6. The wireless communication method of claim 3,
    wherein when the first scheduling information and the second scheduling information indicate that a maximum power for the first transmission is a first power and the maximum power for the second transmission is a second power, the wireless terminal drops the first transmission and performs the second transmission, wherein when the second scheduling information indicates that a number of antenna ports configured to the second transmission is greater than one, the wireless terminal drops the first transmission and performs the second transmission, wherein when the second scheduling information indicates that the number of antenna ports configured to a sound reference signal (SRS) resource of the second transmission is greater than one, the wireless terminal drops the first transmission and performs the second transmission, wherein when the timing of receiving the first scheduling information is no later than the timing of receiving the second scheduling information, the wireless terminal performs the first transmission, wherein the wireless terminal performs the second transmission when determining at least one of that the maximum power for the second transmission is a first power, that the number of antenna ports configured to the second transmission is one or that the number of antenna ports configured to the SRS resource of the second transmission is one, wherein the wireless terminal drops the second transmission when determining at least one of that the maximum power for the second transmission is a second power, that the number of antenna ports configured to the second transmission is greater than one or that the number of antenna ports configured to the SRS resource of the second transmission is greater than one, wherein when the timing of receiving the first scheduling information is after the timing of receiving the second scheduling information, the wireless terminal performs the second transmission, wherein the wireless terminal performs the first transmission when determining at least one of that the maximum power for the second transmission is a first power, that the number of antenna ports configured to the second transmission is one or that the number of antenna ports configured to the SRS resource of the second transmission is one, or wherein the wireless terminal drops the first transmission when determining at least one of that the maximum power for the second transmission is a second power, that the number of antenna ports configured to the second transmission is greater than one or that the number of antenna ports configured to the SRS resource of the second transmission is greater than one.

7. The wireless communication method of claim 6, wherein the period of the first transmission overlapping the second transmission is within one of a downlink sub-frame or a special sub-frame.

8. A wireless terminal, comprising:
a processor, configured to:
configure a first antenna to a first wireless network node in a first period of a time pattern, and
configure the first antenna and a second antenna to a second wireless network node in a second period of the time pattern,
wherein the first wireless network node is one of a master wireless network node and the secondary wireless network node and the second wireless network node is another one of the master wireless network node and the secondary wireless network node,
wherein the time pattern is a time division duplexing (TDD) configuration,
wherein one of the first period and the second period is configured within an uplink sub-frame,
wherein, in response to the wireless terminal operating in a first mode in the first period of the TDD configuration, the first antenna is configured for the first wireless network node supporting long-term evolution (LTE) and the second antenna is not configured for the first wireless network node supporting LTE, and
wherein, in response to the wireless terminal operating in a second mode in the second period of the TDD configuration, both the first antenna and the second antenna are configured for the second wireless network node supporting new radio (NR).

9. The wireless terminal of claim 8, wherein the first period does not overlap with the second period.

10. The wireless terminal of claim 8, further comprising a communication unit configured to:
receive, from the first wireless network node, first scheduling information for a first transmission to the first wireless network node, and
receive, from the second wireless network node, second scheduling information for a second transmission to the second wireless network node, and
wherein the processor is further configured to:
perform at least one of the first transmission or the second transmission when determining the first transmission overlaps the second transmission.

11. The wireless terminal of claim 10,
wherein when an overlapping period is within an uplink sub-frame, the wireless terminal performs the first transmission, and drops the second transmission, or performs the second transmission when determining the second transmission requires one antenna, wherein when the overlapping period is within one of a downlink sub-frame or a special sub-frame, the wireless terminal performs the second transmission, wherein when the first scheduling information and the second scheduling information indicate that a maximum power for the first transmission is a first power and the maximum power for the second transmission is a second power, the wireless terminal drops the second transmission and performs the first transmission, wherein when the first scheduling information and the second scheduling information indicate that the maximum power for the first transmission is a first power and the maximum power for the second transmission is the first power, the wireless terminal performs the first transmission and the second transmission, wherein when the second scheduling information indicates that a number of antenna ports configured to the second transmission is greater than one, the wireless terminal drops the second transmission and performs the first transmission, wherein when the second scheduling information indicates that the number of antenna ports configured to the second transmission is one, the wireless terminal performs the first transmission and the second transmission, wherein when the second scheduling information indicates that the number of antenna ports configured to a sound reference signal (SRS) resource of the second transmission is greater than one, the wireless terminal drops the second transmission and performs the first transmission, wherein when the second scheduling information indicates that the number of antenna ports configured to the SRS resource of the second transmission is one, the wireless terminal performs the first transmission and the second transmission.

12. The wireless terminal of claim 11, wherein the period of the first transmission overlapping the second transmission is within an uplink sub-frame or within one of a downlink sub-frame or a special sub-frame.

13. The wireless terminal of claim 10,
wherein when the first scheduling information and the second scheduling information indicate that a maximum power for the first transmission is a first power and the maximum power for the second transmission is a second power, the wireless terminal drops the first transmission and performs the second transmission,
wherein when the second scheduling information indicates that a number of antenna ports configured to the second transmission is greater than one, the wireless terminal drops the first transmission and performs the second transmission,
wherein when the second scheduling information indicates that the number of antenna ports configured to the SRS resource of the second transmission is greater than one, the wireless terminal drops the first transmission and performs the second transmission,
wherein when the timing of receiving the first scheduling information is no later than the timing of receiving the second scheduling information, the wireless terminal performs the first transmission, wherein the wireless terminal performs the second transmission when determining at least one of that the maximum power for the second transmission is a first power, that the number of antenna ports configured to the second transmission is one or that the number of antenna ports configured to the SRS resource of the second transmission is one,
wherein the wireless terminal drops the second transmission when determining at least one of that the maximum power for the second transmission is a second power, that the number of antenna ports configured to the second transmission is greater than one or that the number of antenna ports configured to the SRS resource of the second transmission is greater than one,
wherein when the timing of receiving the first scheduling information is after the timing of receiving the second scheduling information, the wireless terminal performs the second transmission,
wherein the wireless terminal performs the first transmission when determining at least one of that the maximum power for the second transmission is a first power, that the number of antenna ports configured to the second transmission is one or that the number of antenna ports configured to the SRS resource of the second transmission is one, or
wherein the wireless terminal drops the first transmission when determining at least one of that the maximum power for the second transmission is a second power, that the number of antenna ports configured to the second transmission is greater than one or that the number of antenna ports configured to the SRS resource of the second transmission is greater than one.

14. The wireless terminal of claim 13, wherein the period of the first transmission overlapping the second transmission is within one of a downlink sub-frame or a special sub-frame.

* * * * *